United States Patent [19]

Oishi et al.

[11] 4,032,820

[45] June 28, 1977

[54] HORIZONTAL DOUBLE PLANE HIGH VOLTAGE SWITCHING ASSEMBLY

[75] Inventors: Kazuaki Oishi; Seizo Nakano, both of Hitachi; Shouetu Suda, Ibaraki, all of Japan

[73] Assignee: Hitachi, Ltd., Japan

[22] Filed: May 5, 1975

[21] Appl. No.: 574,328

[30] Foreign Application Priority Data

May 6, 1974 Japan .................. 49-54675
June 12, 9174 Japan .................. 49-65934
June 19, 1974 Japan .................. 49-70700

[52] U.S. Cl. .................. 361/333; 200/148 B; 361/341
[51] Int. Cl.² .................. H02B 1/04
[58] Field of Search .......... 174/72 B, 99 B, 71 B; 317/103; 200/144 R, 48 R, 301, 145, 148 R, 148 G

[56] References Cited

UNITED STATES PATENTS

| 3,364,398 | 1/1968 | Stipcevich | 317/103 |
| 3,578,927 | 5/1971 | Roth | 200/148 R |
| 3,701,929 | 10/1972 | Taguchi | 174/72 B |
| 3,930,188 | 12/1975 | Olsen | 317/103 |

Primary Examiner—Gerald P. Tolin
Attorney, Agent, or Firm—Craig & Antonelli

[57] ABSTRACT

Gas circuit breakers, gas insulated disconnecting switches, current transformers, gas insulated feeding bus bars and other main component devices making up a gas insulated power switch-gear apparatus used for the power electric substation or the power electric switching station are arranged in at least one straight line in a horizontal plane. Gas insulated main bus bars are arranged substantially at right angles to the straight lines including the component devices, in a different plane parallel to the above-mentioned plane containing the devices, thus reducing the height of the apparatus as a whole and at the same time improving the earthquake-proofness thereof.

12 Claims, 19 Drawing Figures

HORIZONTAL DOUBLE PLANE HIGH VOLTAGE SWITCHING ASSEMBLY

The present invention relates to an insulated power switch-gear apparatus, or more in particular to an improvement in the insulated power switch-gear apparatus suitable for superhigh voltage power electric substations or power electric switching stations.

Power electric substations or power electric switching stations in or around big cities or seaside areas tend to be constructed in the form of what are called "compact substations or switching stations" in which component electric devices are sealed in an insulating gas or immersed in an insulating oil, for the reasons of difficulty in acquiring land or preventing nuisances from salt.

In order to sharply reduce the area of land, the above-mentioned type of compact substation is so constructed that the required devices are arranged in three dimensions and connected by means of insulated bus bars sealing such insulating fluid as $SF_6$ gas.

For the purpose of the three-dimensional arrangement, it is common practice to dispose comparatively heavy circuit breakers underside, and current transformers, disconnecting switches, ground switches and the like upwardly of the circuit breakers in two directions through feeding bus bars. Further, main bus bars are appropriately positioned above the circuit breakers. When the voltage to be transmitted is an ultra superhigh voltage of 220 KV to 500 KV or thereabouts, devices of great weight must be used and the insulated switch-gear apparatus becomes very tall in the substations. In the gas-insulated power switch-gear apparatus for a compact substation rated at 500 KV and filled with $SF_6$ gas as an insulating fluid, for example, the height of one phase unit of the gas circuit breaker is about 3 to 4 m and the diameter of one phase unit of the gas insulated bus bar is 0.8 m, so that the position of the main bus bars with the rise portions of the feeding bus bars and other devices taken into consideration is as high as 8 to 10 m from the ground. As a result, supporting bases for the exclusive use of the main bus bars are required on the one hand and the earthquake-proofness of the insulated switch-gear apparatus as a whole is deteriorated on the other. Therefore, not only the connections of the devices but also the insulating spacers for gas containment or supporting conductors as well as insulators are likely to be damaged, often resulting in failure of power transmission.

The apparatuses for ultra superhigh voltage substations which are used for important power trunk lines should not be subjected to failure even for a moment. One solution to this serious problem may be to support the bus bars and disconnecting switches arranged at high positions on strong bases. However, this inconveniently requires a great amount of materials.

Even when the devices are successfully supported on the strong bases, the assembly work and maintenance and inspection at such high places accompany a safety problem.

Furthermore, in the gas-insulated switch-gear apparatus of the above-mentioned type, it is necessary to provide the feeding bus bars of various complicated shapes including linear, T-shaped, L-shaped, X-shaped and Z-shaped arrangements for connecting the component devices with each other, in accordance with the manner in which the devices are arranged.

In addition to the requirement for adoption of various shapes of feeding bus bar arrangement, they must be prepared in various lengths and sizes, thus requiring a long time for manufacture and assembly thereof.

An object of the present invention is to provide a gas-insulated power switch-gear apparatus having an improved earthquake-proofness by improving the arrangement of the devices making up the gas-insulated power switch-gear apparatus.

Another object of the present invention is to provide a gas-insulated power switch-gear apparatus which is easily assembled, erected, maintained and inspected.

A further object of the invention is to provide a gas-insulated power switch-gear apparatus capable of being applied to various feeder systems without any considerable changes in arrangement of the component devices.

Still another object of the invention is to provide a gas-insulated power switch-gear apparatus in which part of the main bus bars and most of the feeding bus bars are standardized so that the switch-gear apparatus may be comprised of a minimum number of component devices.

In order to achieve the above-described objects, the present invention is characterized in that the main component devices including the circuit breakers, current transformers, disconnecting switches and feeding bus bars are arranged in at least one straight line in one horizontal plane, while the main bus bars are disposed at substantially right angles to the direction of arrangement of the above-mentioned main component devices in a second plane parallel to the plane in which the main component devices are arranged.

The present invention is successfully embodied by employing puffer-type $SF_6$ gas tank circuit breakers horizontally disposed on supports on the foundation, by providing gas-separated lead terminals through insulating spacers at the longitudinal ends of the tank in the direction of operation of at least a couple of contacts included in each of the gas-insulated circuit breakers, by arranging the current transformers, the disconnecting switches and the feeding bus bars in at least one straight line in the direction in which the lead terminals are taken out, namely, longitudinally of the tank, and by arranging the main bus bars in an upper or lower plane in at least a straight line at right angles to the direction of the arrangement of the above-mentioned devices in proximity to the plane in which the above-mentioned devices are arranged.

For the purpose of the present specification, the arrangement of the devices according to the present invention will be referred to as the horizontal double-plane arrangement.

According to the method of the horizontal double-plane arrangement of the devices, the whole of the insulated switch-gear apparatus built around the circuit breakers is positioned low in height and the center of gravity thereof becomes low accordingly, thereby greatly improving the earthquake-proofness of the apparatus.

Also, the fact that the main bus bars can be constructed in proximity to the circuit breakers facilitates the supporting work and thus eliminates the need for any tall strong supports, thereby making possible safe assembly, maintenance and inspection of the apparatus.

By the way, the circuit breakers used in the present invention are not limited to the above-mentioned puffer-type gas circuit-breakers but the double-pressure type SF$_6$ gas circuit breakers, internal disconnection type air circuit breakers or the like are applicable with equal effect.

According to another aspect of the invention, sheaths for containing the conductors of those parts of the main bus bars which are connected to the feeding circuits and the feeding bus bars comprise at least one first unit having a protruded feeding port at the longitudinal center thereof and at least one second unit also having a protruded feeding port located at a longitudinal end thereof, so that the two types of units or the feeding ports thereof are combined to connect the gas-insulated feeding bus bars of three phases and the gas-insulated main bus bars to each other.

In this way, most of the gas insulated feeding bus bars are capable of being standardized in two types of units as well as the feeding ports of the gas insulated main bus bars, thus facilitating the assembly work thereof while at the same time reducing the number of items of component devices required.

The above and other objects, features and advantages will be made apparent by the detailed description taken in conjunction with the accompanying drawings, in which.

Figure 1:
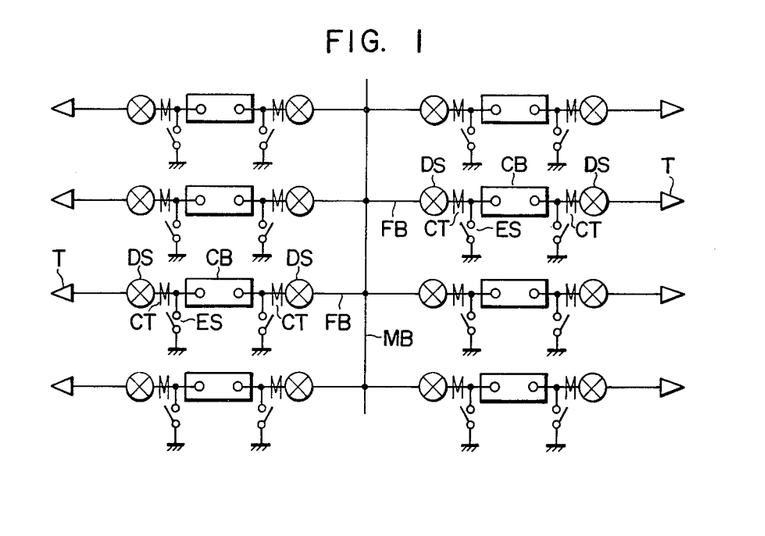
FIG. 1 to FIG. 4 are diagrams showing the connections of skeleton diagram of the various devices included in an ordinary power electric substation or power electric switching station.
Figure 2:
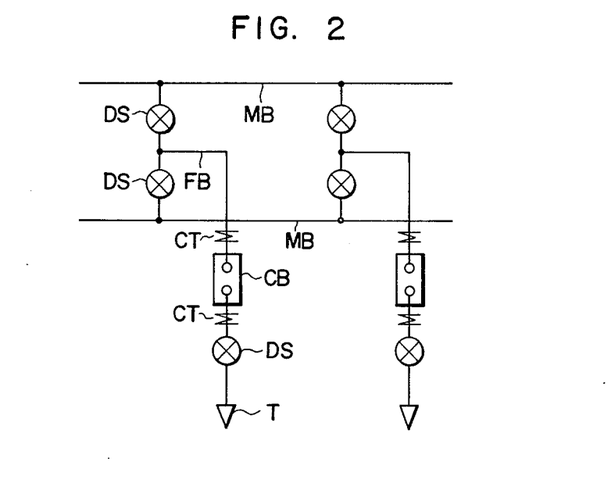
Figure 3:
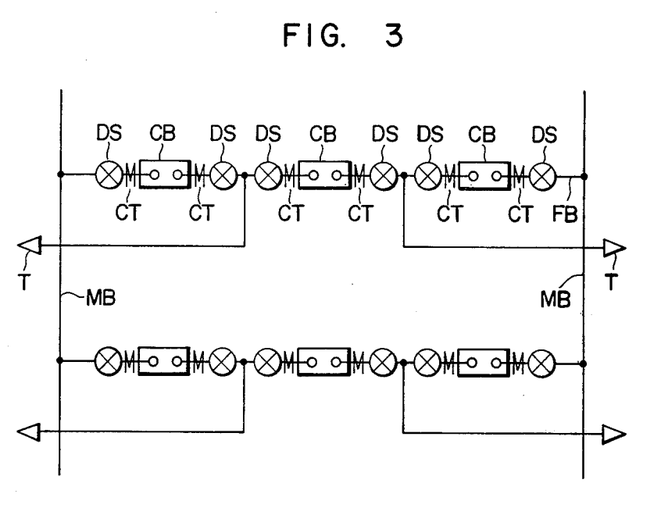

Referring to FIG. 1 to FIG. 3 showing examples of the Skeleton diagram connections in an ordinary power electric substation or switching station, reference symbol MB shows main bus bars, symbol FB feeding bus bars, symbol DS disconnecting switches, symbol CT current transformers, symbol CB circuit breakers, symbol ES grounding switches, and symbol T terminals such as cable heads or bushings.

Figure 5:
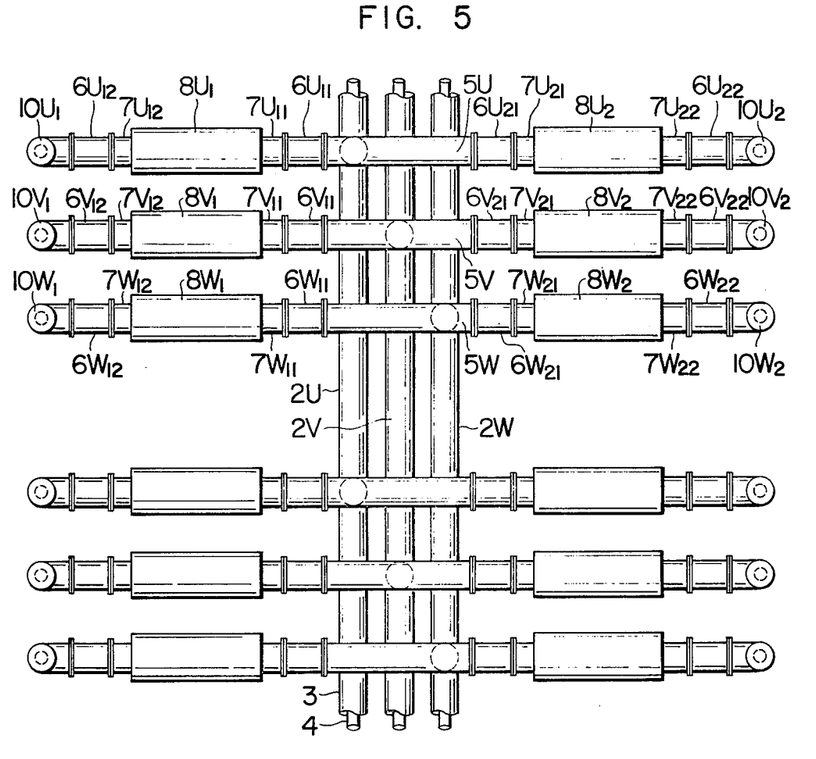
FIG. 5 is a plan view showing an embodiment of the gas-insulated power switch-gear apparatus according to the invention constructed in accordance with the circuit connection skeleton diagram of FIG. 1.
Figure 6:
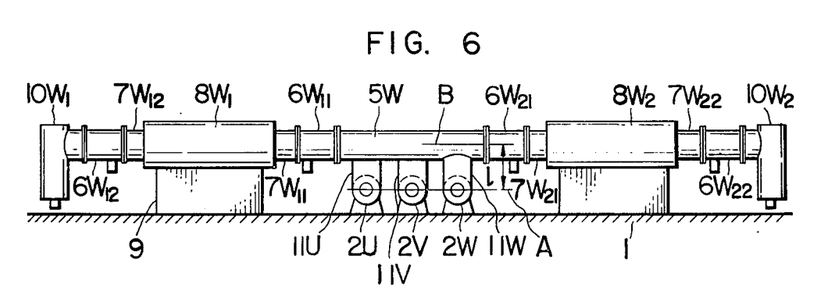
FIG. 6 is a side view of the embodiment of FIG. 5.

The diagram of FIG. 1 illustrates the case in which a plurality of feeding bus bars FB are taken out from a single main bus bar MB. And the construction of the gas insulated power switch-gear apparatus according to the present invention corresponding to the above-mentioned case is shown in FIGS. 5 and 6.

In the embodiment under consideration, three main bus bars 2U, 2V and 2W for three phases are arranged in parallel in proximity to the foundation 1.

Each of the main bus bars 2U, 2V and 2W for the respective phases has a sheath 3 filled with SF$_6$ gas, which contains a bus bar conductor 4 supported by an insulating spacer or insulator not shown in the drawing. Reference symbols 5U, 5V and 5W show the feeding bus bars for the three phases arranged at right angles to and above the main bus bars 2U, 2V and 2W. Each end of each feeding bus bar has, say, at the left end thereof, the disconnecting switches $6U_{11}$, $6V_{11}$ and $6W_{11}$, the current transformers $7U_{11}$, $7V_{11}$ and $7W_{11}$, and the gas circuit breakers $8U_1$, $8V_1$ and $8W_1$ arranged in straight lines and sealed in sheaths filled with SF$_6$ gas.

The respective gas circuit breakers $8U_1$, $8V_1$ and $8W_1$ are mounted on the foundation through the supports 9. The current transformers $7U_{12}$, $7V_{12}$ and $7W_{12}$, the disconnecting switches $6U_{12}$, $6V_{12}$ and $6W_{12}$ and the cable heads $10U_1$, $10V_1$ and $10W_1$ are arranged in that order in straight lines to the left of the gas circuit breakers $8U_1$, $8V_1$ and $8W_1$ respectively.

Toward the other end or right end of the feeding bus bars 5U, 5V and 5W, on the other hand, there are provided the gas circuit breakers $8U_2$, $8V_2$ and $8W_2$ which are reached through the disconnecting switches $6U_{21}$, $6V_{21}$ and $6W_{21}$ and the current transformers $7U_{21}$, $7V_{21}$ and $7W_{21}$. From these gas circuit breakers, a rectilinear arrangement of the current transformers $7U_{22}$, $7V_{22}$ and $7W_{22}$ and the disconnecting switches $6U_{22}$, $6V_{22}$ and $6W_{22}$ leads to the cable heads $10U_2$, $10V_2$ and $10W_2$. In view of the fact that the plane A containing the main bus bars 2U, 2V and 2W is apart from the plane B containing the series of rectilinearly connected devices by not more than the length $l$, these two different types of bus bars are adapted to be connected through the protrusions 11U, 11V and 11W formed on one or both of the bus bars. Incidentally, the main bus bars 2U, 2V and 2W may be supported on the foundation 1 longitudinally thereof in a desired manner.

Figure 9:
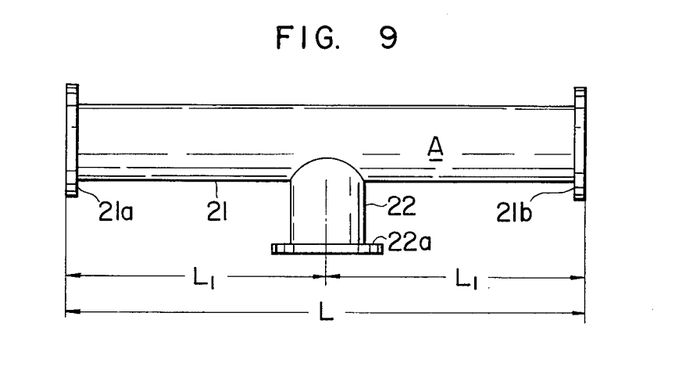
FIG. 9 is a side view showing an example of the bus bar unit.
Figure 10:
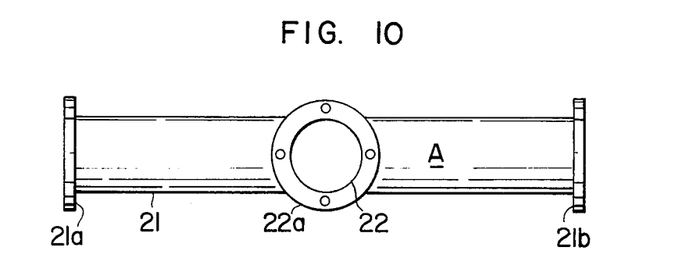
FIG. 10 is a plan view showing the unit of FIG. 9.
Figure 11:
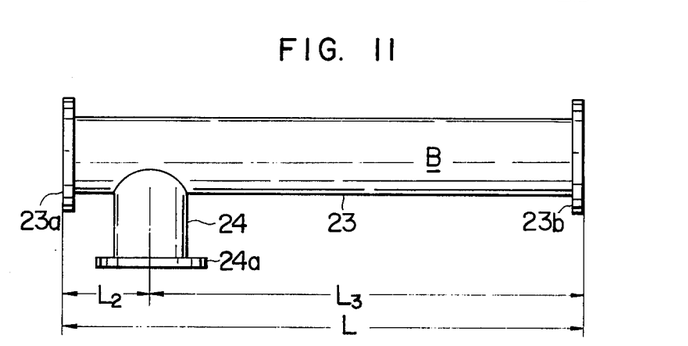
FIG. 11 is a side view showing another example of the bus bar unit.

The diagrams of FIG. 9 to FIG. 11 show examples of the construction of the main bus bar unit according to the invention, in which the main bus bar unit A shown in FIGS. 9 and 11 comprises a cylindrical sheath 21, coupling flanges 21a and 21b at the ends of the sheath 21, a feeding port 22 protruded from the center of the sheath 21 in a direction perpendicular thereto and a coupling flange 22a.

The length from the center of the feeding port 22 to either end of the main bus bar unit A is equal to $L_1$, L being the length of the unit.

The construction of another bus bar unit B is shown in FIG. 11. Flanges 23a and 23b are formed on the ends of the cylindrical sheath 23 having the same diameter as the bus bar unit A. A feeding port 24 sided to one end of the sheath 23 is protruded in a direction perpendicular to the longitudinal direction of the sheath 23, so that a coupling flange 24a corresponding to the coupling flange 22a in the preceding embodiment is formed at the end of the feeding port 24.

As will be seen, the length of the bus bar unit B is substantially equal to the length L of the aforementioned bus bar unit A, and the length $L_2$ from one end to the feeding port 24 is shorter than the length $L_3$ from the other end to the feeding port 24, the feeding port 24 being sided to the former end.

Figure 7:
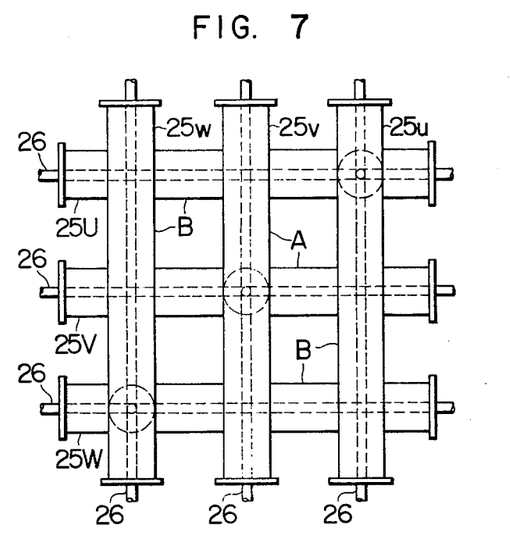
FIG. 7 is a plan view showing the manner in which the bus bar units used in the invention are connected to the feeding circuit.
Figure 8:
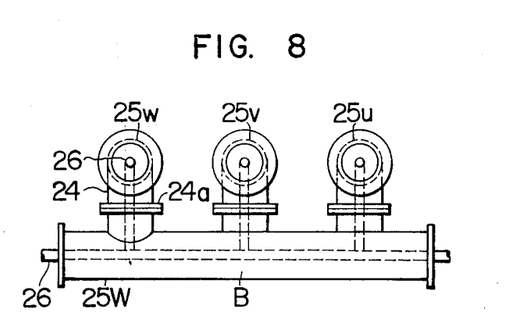
FIG. 8 is a side view of the connection shown in FIG. 7.

An example of the connection of a combination of phase-separated three-phase main bus bars 25U, 25V and 25W of the aforementioned two different types of units A and B to the feeding bus bars is shown in FIGS. 7 and 8. The three-phase feeding bus bars 25u, 25v and 25w are arranged in parallel to each other, upwardly of and at right angles to the main bus bars 25U, 25V and 25W.

Among the above-described bus bars, the main bus bar 25V and the feeding bus bar 25v may be made of the bus bar units A, whereas the main bus bars 25U and 25W and the feeding bus bars 25u and 25w may be comprised of the bus bar units B.

As a result, the conductors 26 of the respective main bus bars may be connected to those of the feeding bus bars through the corresponding feeding ports. The main bus bar 25W of phase W is adapted to be connected to the feeding bus bar 25w, for instance, in such a manner that a couple of bus bar units B are arranged at right angles to each other with their feeding ports 24 opposed, so that the conductors 26 of the two bus bars are connected and the respective flanges 24a coupled with each other.

Figure 12:
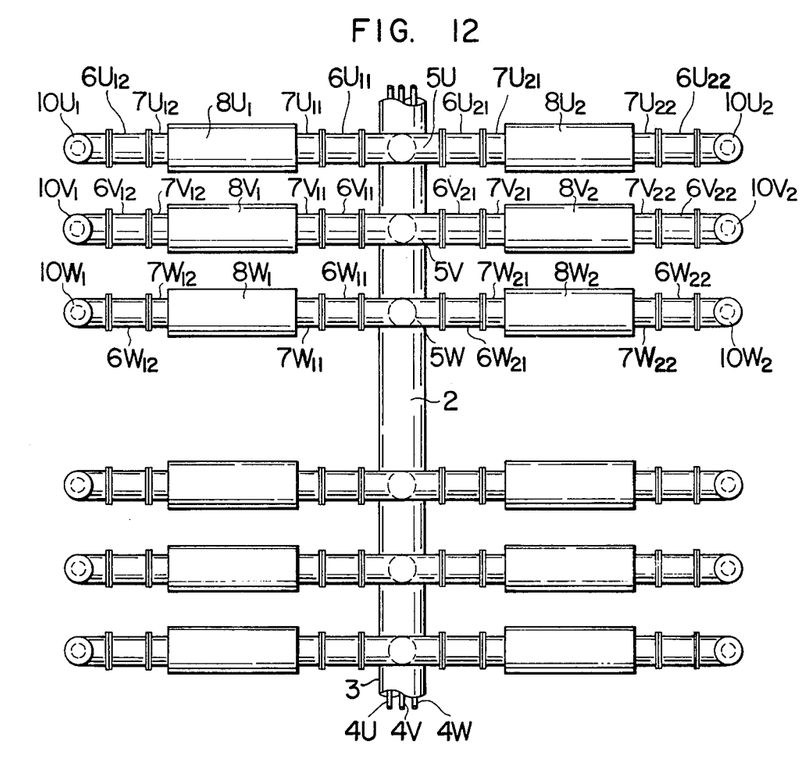
FIG. 12 is a plan view showing the gas insulated power switch-gear apparatus according to another embodiment of the present invention.
Figure 13:
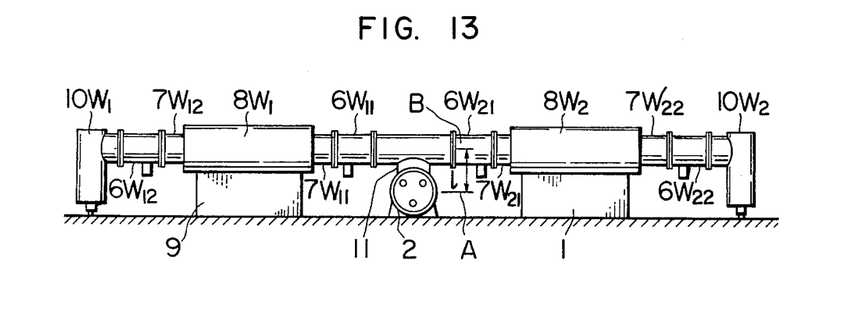
FIG. 13 is a side view showing the embodiment of FIG. 12.

The embodiment shown in FIGS. 12 and 13 is such that the conductors 4U, 4V and 4W of the three-phase main bus bars illustrated in FIGS. 5 and 6 are contained in one sheath 3 thereby to obtain a main bus bar 2 of three phases.

When a comparatively low voltage is involved, the present invention may be embodied in such a manner that the feeding bus bars 5u, 5v and 5w, the disconnecting switches 6U, 6V and 6W or the circuit breakers 8U, 8V and 8W as well as the main bus bars may be contained in a single casing or sheath commonly for three phases.

Figure 14:
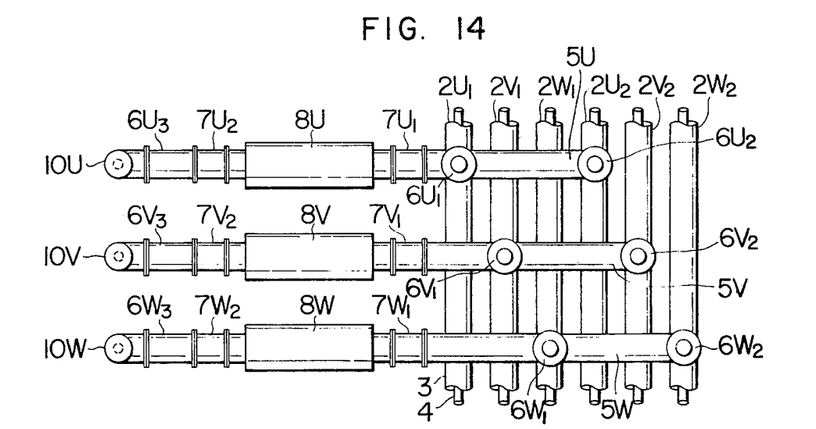
FIG. 14 is a plan view showing the gas insulated power switch-gear apparatus according to still another embodiment of the invention which is constructed in accordance with the circuit connection Skeleton diagram of FIG. 2.
Figure 15:
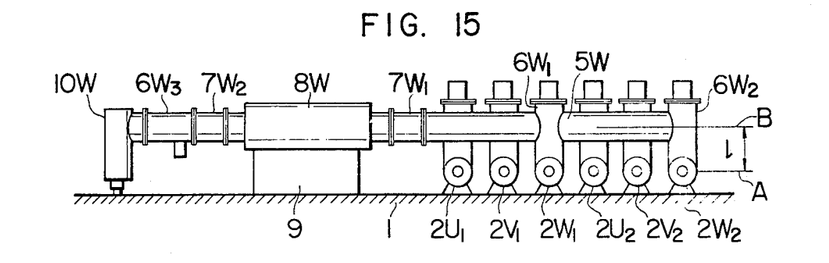
FIG. 15 is a side view of the embodiment of FIG. 14.

The embodiment shown in FIGS. 14 and 15 corresponds to the example of the Skeleton diagram of FIG. 2 and refers to the case involving plural main bus bars.

In the embodiment under consideration, first three-phase main bus bars $2U_1$, $2V_1$ and $2W_1$ in parallel to second three-phase main bus bars $2U_2$, $2V_2$ and $2W_2$ are mounted on the foundation 1. The three-phase feeding bus bars 5U, 5V and 5W, on the other hand, in parallel to each other are arranged above and at right angles to the main bus bars. The disconnecting switches $6U_1$, $6U_2$; $6V_1$, $6V_2$; $6W_1$, $6W_2$ are disposed at the connections between the three-phase feeding bus bars 5U, 5V and 5W and the respective pairs of the first and second main bus bars $2U_1$, $2U_2$; $2V_1$, $2V_2$; $2W_1$, $2W_2$. The left ends of the feeding bus bars are connected through the current transformers $7U_1$, $7V_1$ and $7W_1$ to the gas circuit breakers 8U, 8V and 8W which are further connected through the current transformers $7U_2$, $7V_2$ and $7W_2$ and through the disconnecting switches $6U_3$, $6V_3$ and $6W_3$ to the cable heads 10U, 10V and 10W in straight lines.

Figure 16:
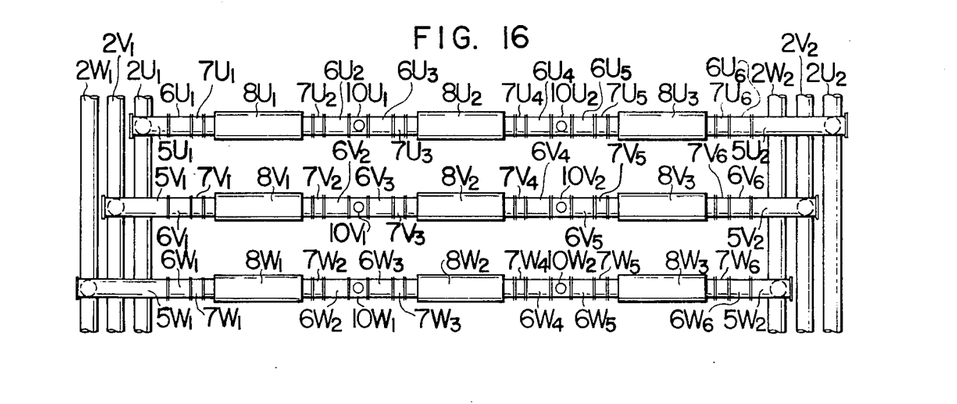
FIG. 16 is a plan view of the gas insulated power switch-gear apparatus according to a further embodiment of the invention which is constructed in accordance with the circuit connection Skeleton diagram of FIG. 3.
Figure 17:
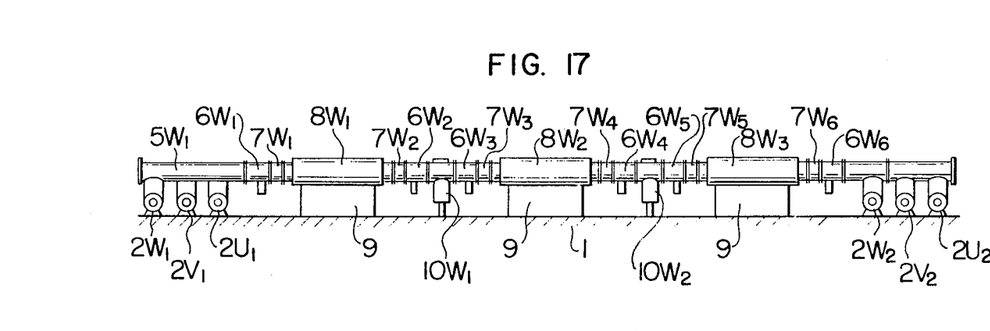
FIG. 17 is a side view of the embodiment of FIG. 16.

It is also true in the embodiment under consideration that the plane A containing the main bus bars is parallel to and spaced only the length $l$ from the plane B containing the feeding bus bars and the devices connected thereto, thus lowering the height of the insulated gas power switch-gear apparatus as a whole. The diagrams of FIGS. 16 and 17 show an embodiment corresponding to the Skeleton diagram shown in FIG. 3, which is applied to an insulated power switch-gear apparatus of a bundle bus system in which three circuit breakers are connected in series with each other between main buses and feeding buses are derived from respective junction points between the adjacent circuit breakers.

The embodiment under consideration is so constructed that the first and second main bus bars $2U_1$, $2V_1$, $2W_1$; and $2U_2$, $2V_2$, $2W_2$ are arranged substantially in parallel at the extreme left and right ends of the foundation respectively, and the various devices fed by the main bus bars are disposed between these two groups of main bus bars at right angles thereto.

In other words, the first main bus bars $2U_1$, $2V_1$ and $2W_1$ are connected to the various devices in the plane which is higher than and in proximity to the main bus bars, which plane contains the feeding bus bars $5U_1$, $5V_1$, $5W_1$, the disconnecting switches $6U_1$, $6V_1$, $6W_1$, the current transformers $7U_1$, $7V_1$, $7W_1$, the gas circuit breakers $8U_1$, $8V_1$, $8W_1$, the current transformers $7U_2$, $7V_2$, $7W_2$, the disconnecting switches $6U_2$, $6V_2$, $6W_2$ and the first cable heads $10U_1$, $10V_1$, $10W_1$; which are further connected through the disconnecting switches $6U_3$, $6V_3$, $6W_3$, the current transformers $7U_3$, $7V_3$, $7W_3$, the gas circuit breakers $8U_2$, $8V_2$, $8W_2$, the current transformers $7U_4$, $7V_4$, $7W_4$, the disconnecting switches $6U_4$, $6V_4$, $6W_4$ to the second cable heads $10U_2$, $10V_2$, $10W_2$, and further through the disconnecting switches $6U_5$, $6V_5$, $6W_5$, the current transformers $7U_5$, $7V_5$, $7W_5$, the gas circuit breakers $8U_3$, $8V_3$, $8W_3$, the current transformers $7U_6$, $7V_6$, $7W_6$, the disconnecting switches $6U_6$, $6V_6$, $6W_6$, the feeding bus bars $5U_2$, $5V_2$, $5W_2$ to the second main bus bars $2U_2$, $2V_2$, $2W_2$, respectively, in straight lines.

The horizontal double-plane arrangement is also possible in the embodiment described above.

Even though the current transformers are contained in independent cases between the gas circuit breakers and the disconnecting switches in the preceding embodiments, the current transformers may alternatively be housed commonly in the cases for the disconnecting switches or the circuit breakers.

Figure 4:
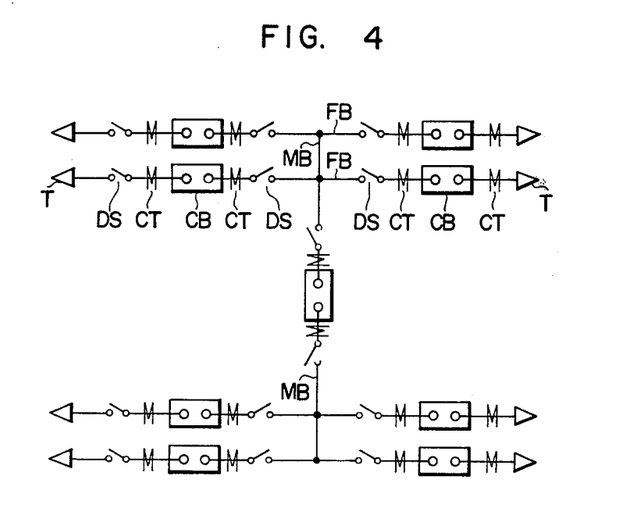
Figure 18:
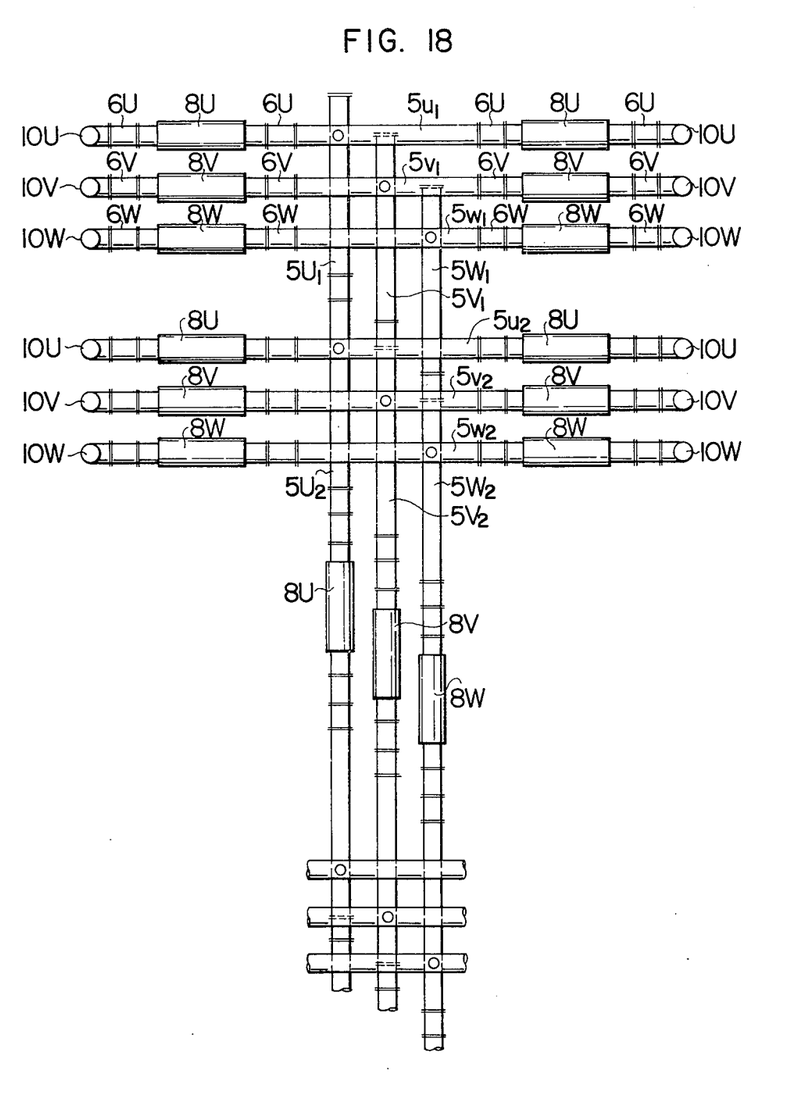
FIG. 18 is a plan view of the gas insulated power switch-gear apparatus according to still another embodiment of the invention which is constructed in accordance with the circuit connection Skeleton diagram of FIG. 4.

Another embodiment corresponding to the Skeleton diagram of the plural-bus bar construction of FIG. 4 is shown in FIG. 18.

The embodiment under consideration is characterized by the fact that all the bus bars including the main bus bars $5u_1$, $5v_1$, $5w_1$; $5u_2$, $5v_2$, $5w_2$ and the connecting tie bus bars $5U_1$, $5U_2$; $5V_1$, $5V_2$; $5W_1$, $5W_2$ are made up of the bus bar units B shown in FIG. 11.

In this embodiment, accordingly, the gas circuit breakers 8U, 8V and 8W inserted in the middle of the main bus bars for connection therewith are displaced from each other in accordance with the phase intervals of the feeding bus bars.

Figure 19:
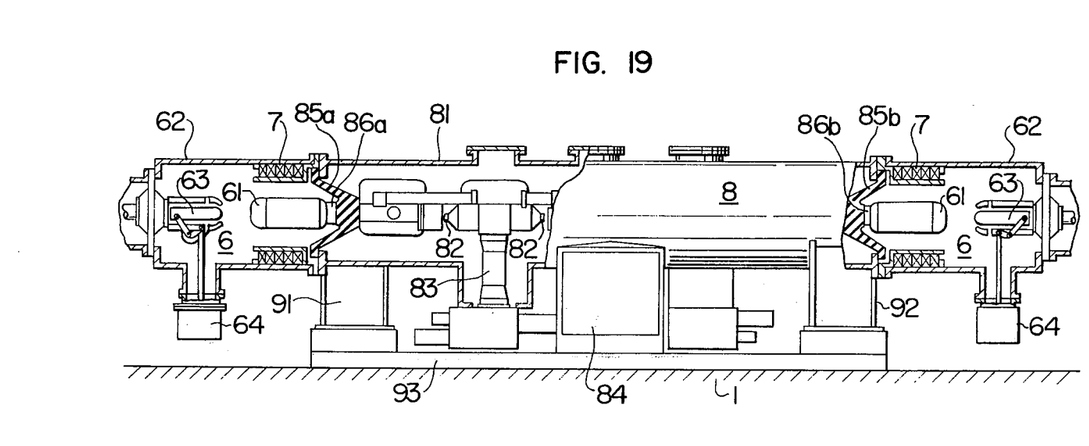
FIG. 19 is a side view showing an example of the construction of the circuit breakers and disconnecting switches used in the invention.

The diagram of FIG. 19 specifically illustrates an example of arrangement of the devices including the current transformers which are contained together with the disconnecting switches in the casings for the latter. In the drawing, the gas circuit breaker 8 comprises a plurality of breaker sections 82 supported by hollow insulating cylinders 83 within the tank 81 filled with SF$_6$ gas. The breaker sections 82 are adapted to be operated by a control system (not shown) contained in the control system housing 84. The tank 81 is supported on the foundation 1 through the common base 93 by supports 91 and 92.

The longitudinal ends of the tank 81 are provided with conical insulating spacers 85a and 85b for gas confinement. The fixed contacts 61 of the disconnecting switches 6 are mounted on the terminal conductors 86a and 86b hermetically passing through the centers of the insulating spacers 85a and 85b, respectively.

Reference numeral 62 shows sheaths each of which forms a disconnecting switch chamber for gas confinement by being integrally coupled to the tank 81. Each of the sheaths 62 contains a movable contact 63 with the mating fixed contact 61 opposed thereto.

Numeral 64 shows control devices protruded from the sheaths for operating the disconnecting switches. Each of the current transformers 7 is arranged in the sheath 62 forming the disconnecting switch chamber, in such a manner as to surround the fixed contact 61.

As will be seen from the foregoing description, according to the present invention, the gas insulated power switch-gear apparatus making up an electric power substation or electric power switching station comprises current transformers, disconnecting switches, feeding bus bars, lead terminals and other devices arranged in straight lines in the same horizontal plane and insulated by an insulating gas filled in the circuit breakers arranged longitudinally of the devices horizontally on the foundation, and the main bus bars are arranged substantially at right angles to the direction of arrangement of and in close proximity to the devices in a different parallel plane. Thus a horizontal double-plane arrangement of the gas insulated power switch-gear apparatus is realized, the height thereof lowered, and therefore the devices are capable of being positioned close to the foundation, resulting in a marked improvement in the earthquake-proofness of the apparatus.

Further, the horizontal double-plane arrangement according to the present invention eliminates the need for supporting the main bus bars high above the foundation and therefore the supporting bases thereof need not be constructed so strongly and in large size, with the result that the assembly, maintenance and inspection work are conducted safely on the one hand and the materials are considerably saved in amount on the other, while at the same time greatly reducing the length of the feeding bus bars for connecting the main bus bars to the devices.

It is also aleady mentioned that the present invention is characterized by the two types of sheaths for the bus bars including the one with a feeding port protrusion provided at the longitudinal center thereof and the other with a feeding port protrusion sided to a longitudinal end thereof, so that the bus bars are connected with each other by coupling different combinations of the feeding port protrusions. In this way, the difficulty so far encountered in standardizing the devices making up the gas insulated power switch-gear apparatus is overcome by reducing the numbers of types of the bus bars to two as well as by merely unifying the connecting parts of the devices including the circuit breakers, disconnecting switches and the current transformers, thus making it possible to standardize the whole of the gas insulated power switch-gear apparatus.

It will be understood from the above description that the present invention makes possible not only the manufacture of the gas insulated power switch-gear apparatus within a short time but the unification of the sizes and common use of the spare bus bars on the working site as well as the reduction in the number of items of spare parts to be prepared.

What is claimed is:

1. A gas insulated power switch-gear apparatus comprising:
   at least one circuit breaker including a cylindrical tank filled with an insulating quenching gas having its axis substantially parallel with a foundation of the apparatus and spaced with a predetermined distance from said foundation, and at least one breaker section electrically insulated and supported within said tank along said axis;
   at least one gas insulated feeding bus bar including a feeding conductor and a sheath filled with an insulating gas and having said feeding conductor insulatingly supported therein;
   at least one gas insulated main bus bar including a main conductor and a sheath filled with an insulating gas and having said main conductor insulatingly supported therein; and
   at least one gas insulated disconnecting switch arranged within a sheath filled with an insulating gas having two terminals, one connected with said circuit breaker and the other connected with said main bus bar through said feeding bar;
   wherein said gas insulated feeding bus bar and said gas insulated disconnecting switch are disposed on the extension of said axis of said tank, and said gas insulated main bus bar is spaced from said foundation with a distance different from said predetermined distance and disposed substantially in parallel with said foundation and at right angles to said axis and its extension.

2. A gas insulated power switch-gear apparatus according to claim 1 in which said gas insulated disconnecting switch has a couple of contacts opposed to each other and adapted to be either brought into contact with or detached from each other in a direction coinciding with said extension of the axis of said tank.

3. A gas insulated power switch-gear apparatus according to claim 1 in which said gas insulated disconnecting switch has a couple of contacts opposed to each other and adapted to be either brought into contact with or detached from each other in a direction substantially perpendicular to said extension of the axis of said tank.

4. A gas insulated power switch-gear apparatus according to claim 1, further comprising at least one bushing-type current transformer arranged with the sheath of said gas insulated disconnecting switch.

5. A gas insulated power switch-gear apparatus according to claim 4 in which said current transformer is supported on the inner wall of said sheath of said gas insulated disconnecting switch.

6. A gas insulated power switch-gear apparatus, which is adapted to be used for three-phase power, comprising:
   at least one three-phase circuit breaker including a cylindrical tank filled with an insulating quenching gas having its axis substantially parallel with a foundation of the apparatus and spaced with a predetermined distance from said foundation, and at least one breaker section provided for each respective one of the three phases electrically insulated and supported within said tank along said axis;

at least one three-phase gas insulated feeding bus bar including three feeding conductors for respective phases disposed in parallel with one another, and a sheath filled with an insulating gas accommodating said feeding conductors;

at least one three-phase gas insulated main bus bar including three main conductors for respective phases disposed in parallel with one another and a sheath filled with an insulating gas accommodating said main conductors; and at least one three phase gas insulated disconnecting switch arranged with a sheath filled with an insulating gas having terminals at one end connected with respective ones of said breaker sections of said three-phase circuit breaker and terminals at the other end connected to respective ones of said conductors of said main bus bar through respective ones of said conductors of said feeding bus bar;

wherein said three-phase gas insulated feeding bus bar and said three-phase gas insulated disconnecting switch are disposed on the extension of said axis of said tank, and said three-phase gas insulated main bus bar is spaced from said foundation with a distance different from said predetermined distance and disposed substantially in parallel with said foundation and at right angles to said axis and its extension.

7. A gas insulated power switch-gear apparatus, which is adapted to be used for three-phase power, comprising:

at least one circuit breaker provided for each respective one of the three phases including a cylindrical tank filled with an insulating quenching gas having its axis substantially parallel with a foundation of the apparatus and spaced with a predetermined distance from said foundation, and at least one breaker section electrically insulated and supported within said tank along said axis;

at least one gas insulated feeding bus bar provided for each respective one of the three phases including a conductor and a sheath filled with an insulating gas accommodating said conductor;

at least one gas insulated main bus bar provided for each respective one of the three phases including a conductor and a sheath filled with an insulating gas accommodating said conductor; and at least one gas insulated disconnecting switch provided for each respective one of the three phases arranged within a sheath filled with an insulating gas having two terminals, one connected with a corresponding one of said circuit breakers and the other connected with a corresponding one of said main bus bars through a corresponding one of said feeding bus bars;

wherein said gas insulated feeding bus bar and said gas insulated disconnecting switch for each respective one of the three phases are disposed on the extension of said axis of a corresponding one of said tanks so as to arrange said gas insulated feeding bus bar, said gas insulated disconnecting switch and said circuit breaker substantially in a straight line, said straight lines for respective phases being substantially in parallel with one another in a plane parallel with said foundation and spaced with said predetermined distance from said foundation, and said gas insulated main bus bars for respective phases are arranged substantially in parallel with one another and at right angles to said straight lines in a plane parallel with said foundation and spaced from said foundation with a distance different from said predetermined distance.

8. A gas insulated power switch-gear apparatus according to claim 7, in which each of said sheaths of said feeding bus bars and main bus bars includes at least one sheath section having a predetermined axial length and having a construction selected from two kinds of constructions, one having a sheath unit projected perpendicularly to the axis of said sheath section from the outer surface of said sheath section at the middle of said predetermined axial length and the other having a sheath unit projected perpendicularly to the axis of said sheath section from the outer surface of said sheath section at a predetermined portion between one end of said predetermined axial length and the middle thereof, said sheath unit including a conductor therewithin connected to the conductor included with said sheath section, and connection of each of said feeding bus bars with a corresponding one of said main bus bars is made by coupling said sheath unit of the sheath section of said feeding bus bar with said sheath unit of the sheath section of said main bus bar and by connecting said conductors included within said sheath units with each other.

9. A gas insulated power switch-gear apparatus according to claim 7, in which said main bus bars are disposed in proximity with one another to form a main bus bar group line, and even numbers of said circuit breakers and even numbers of said disconnecting switches are provided for respective ones of the three phases and disposed on both sides of said group line symetrically with respect to said group line.

10. A gas insulated power switch-gear apparatus according to claim 7, in which said main bus bars are disposed in proximity with one another to form a main bus-bar group line, and said circuit breaker and said disconnecting switch are disposed on one side of said group line.

11. A gas insulated power switch-gear apparatus according to claim 7, in which two of said main bus bars are provided for each respective one of the three phases, first main bus bars for the respective phases being disposed in proximity with one another to form a first main bus bar group line and second main bus bars for respective phases being disposed in proximity with one another to form a second main bus bar group line, said circuit breakers and said disconnecting switches being disposed between said first and second group lines.

12. A gas insulated power switch-gear apparatus, which is adapted to be used for three-phase power, comprising:

at least one circuit breaker provided for each respective one of the three phases including a cylindrical tank filled with an insulating quenching gas having its axis substantially parallel with a foundation of the apparatus and spaced with a predetermined distance from said foundation, and at least one breaker section electrically insulated and supported within said tank along said axis;

at least one gas insulated feeding bus bar provided for each respective one of the three phases including a conductor and a sheath filled with an insulating gas for accommodating said conductor;

at least one three-phase gas insulated main bus bar having three conductors for respective phases disposed in parallel with one another and a sheath filled with an insulating gas for accommodating said conductors; and at least one gas insulated disconnecting switch provided for each respective one of the three phases arranged within a sheath filled with an insulating gas having two terminals, one connected with a corresponding one of said circuit breakers and the other connected with a corresponding one of said conductors of said main bus bar through a corresponding one of said feeding bus bars;

wherein said gas insulated feeding bus bar and said gas insulated disconnecting switch for each respective one of the phases are disposed on the extension of said axis of a corresponding one of said tanks so as to arrange said gas insulated feeding bus bar, said gas insulated disconnecting switch and said circuit breaker substantially in a straight line, said straight lines for respective phases being substantially in parallel with one another in a plane parallel with said foundation and spaced with said predetermined distance from said foundation, said three phase gas insulated main bus bar being disposed substantially at right angles to said straight lines in a plane parallel with said foundation and spaced from said foundation with a distance different from said predetermined distance.

* * * * *